US007563167B2

(12) United States Patent
Walker et al.

(10) Patent No.: US 7,563,167 B2
(45) **Date of Patent: *Jul. 21, 2009**

(54) GAMING DEVICE METHOD AND APPARATUS EMPLOYING MODIFIED PAYOUTS

(75) Inventors: Jay S. Walker, Ridgefield, CT (US); James A. Jorasch, Stamford, CT (US); Scott T. Friesen, New York, NY (US); Steven M. Santisi, Ridgefield, CT (US)

(73) Assignee: Walker Digital, LLC, Stamford, CT (US)

( * ) Notice: Subject to any disclaimer, the term of this patent is extended or adjusted under 35 U.S.C. 154(b) by 1086 days.

This patent is subject to a terminal disclaimer.

(21) Appl. No.: 10/419,304

(22) Filed: Apr. 18, 2003

(65) Prior Publication Data

US 2003/0228902 A1 Dec. 11, 2003

Related U.S. Application Data

(60) Provisional application No. 60/374,437, filed on Apr. 19, 2002.

(51) Int. Cl.
*A63F 13/10* (2006.01)

(52) U.S. Cl. .......................................................... 463/25

(58) Field of Classification Search ..................... 463/1, 463/11-25, 40-42; 273/143 R
See application file for complete search history.

(56) References Cited

U.S. PATENT DOCUMENTS

| | | | | |
|---|---|---|---|---|
| 5,380,008 | A | 1/1995 | Mathis et al. | 273/143 R |
| 5,851,147 | A * | 12/1998 | Stupak et al. | 463/13 |
| 6,068,552 | A | 5/2000 | Walker et al. | 463/21 |
| 6,102,799 | A * | 8/2000 | Stupak | 463/27 |
| 6,117,010 | A * | 9/2000 | Canterbury et al. | 463/20 |
| 6,254,483 | B1 | 7/2001 | Acres | 463/26 |
| 6,419,578 | B1 * | 7/2002 | Moody et al. | 463/13 |
| 6,443,452 | B1 * | 9/2002 | Brune | 273/143 R |
| 6,468,156 | B1 * | 10/2002 | Hughs-Baird et al. | 463/25 |
| 6,589,115 | B2 | 7/2003 | Walker et al. | 463/25 |
| 6,663,487 | B1 * | 12/2003 | Ladner | 463/13 |
| 6,712,693 | B1 * | 3/2004 | Hettinger | 463/20 |
| 6,802,778 | B1 * | 10/2004 | Lemay et al. | 463/42 |

OTHER PUBLICATIONS

Grochowski, John, "Slots remain random, no matter what you do", Chicago Sun-Times, Feb. 9, 2001, Section: Weekend Plan, Casinos, p. 14, NC.

Grochowski, John, "Frequent hits or big jackpots? It's all in the game", Chicago Sun-Times, Jan. 6, 2002, Section: Show, Sunday, p. 6.

(Continued)

*Primary Examiner*—Scott E Jones

(57) ABSTRACT

The invention includes a system and method for a gaming device to determine when to offer a player an opportunity to play using a "jackpot only" pay table. The player may choose to accept the gaming device's offer to switch from using a conventional pay table to using a pay table that only pays top payout amounts. Play with a jackpot only pay table may only require a small wager amount as compared to play with a conventional pay table. Play with a jackpot only pay table may be automated to generate outcomes quickly to allow a player to relatively inexpensively avoid spending time playing a gaming device perceived to be in a "cold period."

40 Claims, 8 Drawing Sheets

OTHER PUBLICATIONS

Website: "California Slots", (http //slotsrus com/balem htm), download date: Apr. 20, 2003.

Website: "Crazy 7s Slot Machine", (http //www slots-gambling com/review-pt-crazy-sevens html), download date: Aug. 20, 2003.

Website: "Fantastic 7's Slots online at Casino Kingdom", (http //www casinokingdom com/Preview/fantastic-sevens-casino-kingdom asp), download date: Aug. 20, 2003.

Website: "Lotteryshop—World Jackpots Online Lottery Ticket Service—Information", (http //www lotteryshop com/worldjackpots/info htm), download date: Aug. 20, 2003.

Website: "Lotteryshop—World Jackpots Online Lottery Ticket Service—Secure Online Entry Form", (http //io powweb com:9629/Is/wjackpots-play htm), download date: Aug. 6, 2003.

* cited by examiner

208

| PLAYER TRACKING NUMBER 500 | NAME 502 | ADDRESS 504 | COMP POINTS 506 | GAMBLING DATA 508 |
|---|---|---|---|---|
| 4127 | BOB SMITH | 125 MAIN ST. ANYTOWN, CT | 1,235 | HIGH ROLLER |
| 4128 | JIM RED | 187 LONG RD. SMALL TOWN, NY | 462 | LOST LAST THREE SPINS |
| 4129 | JOE GREEN | 235 WILLOW DR. BIG CITY, CA | 990 | LOST $27 SO FAR THIS SESSION |

FIG. 5

308

| OUTCOME 600 | EXPECTED HITS 602 | REGULAR PAYOUT 604 | JACKPOT ONLY PAYOUT 606 |
|---|---|---|---|
| CHERRY / ANY / ANY | 680 | 2 | 0 |
| ANY / ANY / CHERRY | 680 | 2 | 0 |
| CHERRY / CHERRY / ANY | 200 | 5 | 0 |
| ANY / CHERRY / CHERRY | 200 | 5 | 0 |
| CHERRY / ANY / CHERRY | 68 | 5 | 0 |
| CHERRY / CHERRY / CHERRY | 20 | 20 | 0 |
| BAR / ORANGE / ORANGE | 42 | 10 | 0 |
| ORANGE / ORANGE / BAR | 6 | 10 | 0 |
| ORANGE /ORANGE / ORANGE | 42 | 20 | 0 |
| BAR / PLUM / PLUM | 20 | 14 | 0 |
| PLUM / PLUM / BAR | 5 | 14 | 0 |
| PLUM / PLUM / PLUM | 50 | 20 | 0 |
| BAR / BELL / BELL | 4 | 18 | 0 |
| BELL / BELL / BAR | 20 | 18 | 0 |
| BELL / BELL / BELL | 20 | 20 | 0 |
| BAR / BAR / BAR | 20 | 50 | 0 |
| 7 / 7 / 7 | 1 | 100 | 100 |
| OTHER | 8,570 | 0 | 0 |

FIG. 6

310

| RULE IDENTIFIER 700 | DESCRIPTION 702 |
|---|---|
| R 001 | PLAYER EXPERIENCES 10 CONSECUTIVE LOSING SPINS |
| R 002 | PLAYER LOST MORE THAN $20 IN 10 MINUTES |
| R 003 | PLAYER MAINTAINS A RATE OF 500 HANDLE PULLS PER HOUR |
| R 004 | RANDOMLY REWARD FIVE DIFFERENT PLAYERS PER WEEK |
| R 005 | GAMBLING DATA INDICATES "HIGH ROLLER" |
| R 006 | CASINO INTRODUCES NEW GAMING MACHINE |

FIG. 7

GAMING DEVICE METHOD AND APPARATUS EMPLOYING MODIFIED PAYOUTS

RELATED APPLICATIONS

This application claims priority to commonly-owned, U.S. Provisional Patent Application No. 60/374,437, filed Apr. 19, 2002, also entitled "Gaming Device Methods And Apparatus Employing Modified Payouts" which is incorporated herein by reference in its entirety for all purposes.

This application is related to commonly-owned, co-pending U.S. patent application Ser. No. 10/417,436 filed Apr. 16, 2003, entitled "Method And Apparatus For Optimizing The Rate Of Play Of A Gaming Device" which is also incorporated herein by reference in its entirety for all purposes.

FIELD OF THE INVENTION

The present invention relates to methods and apparatus related to gaming devices. More specifically, the present invention relates to modifying payouts and/or associated pay tables of gaming devices.

BACKGROUND OF THE INVENTION

There are currently over 500,000 slot machines in operation that together generate more than $15 billion in annual revenue for United States casinos. Most casinos generate more than half of their gaming revenues from slot machines and some individual casinos offer three or four thousand slot machines at a single location. In fact, two different casinos in Connecticut each provide over six thousand slot machines for players. Thus, it is well known within the gaming industry that gaming devices, such as slot machines, are a major draw for players wishing to engage in a gaming experience. Players are often drawn toward gaming machines because of the possibility of winning large jackpots in exchange for a relatively small wager. For example, a player may insert twenty-five cents into a gaming machine and hit a $10,000 jackpot on just one handle pull.

However, many players find that in order to maximize the possibility of winning a large jackpot, they may have to play a particular gaming machine for an extended period of time. Often spending numerous hours at one gaming machine, a player may go through many "hot" or "cold" periods whereby the player may win a large amount of money, lose much of their money, and then win it all back. In the case where a gaming machine may be in a cold period and fail to award any winning combinations for an extended period of time, many players may become frustrated and either stop playing entirely or leave to find what they may believe to be a hot gaming machine. As a result, a need exists for a player to be able to avoid or manage a gaming device's cold periods.

BRIEF DESCRIPTION OF THE DRAWINGS

FIG. 5 is a table illustrating an example data structure of an example player database 208 as depicted in FIG. 2 for use in some embodiments of the present invention.

FIG. 6 is a table illustrating an example data structure of an example pay table database 308 as depicted in FIG. 3 for use in some embodiments of the present invention.

FIG. 7 is a table illustrating an example data structure of an example rules database 310 as depicted in FIG. 3 for use in some embodiments of the present invention.

DETAILED DESCRIPTION OF SOME EMBODIMENTS OF THE INVENTION

Figure 1:
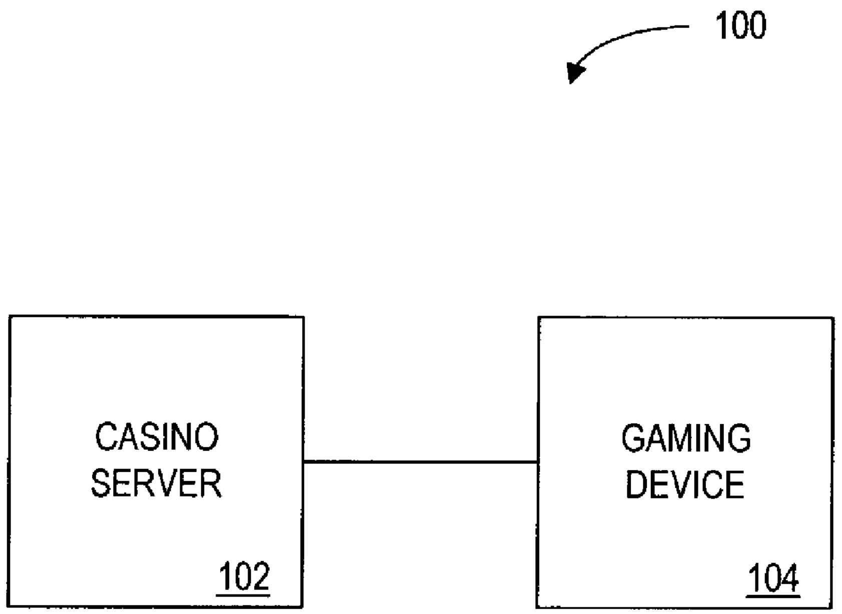
FIG. 1 is a block diagram illustrating an example system 100 according to some embodiments of the present invention.

The disclosed invention overcomes the above and other drawbacks of the prior art by allowing a player to economically play for top jackpots while "running a cold streak out of a slot machine." More specifically, this invention allows a player to indicate to a gaming device that he would like to switch from using a regular pay table to using a "jackpot only" pay table that only pays top payout amounts and only requires smaller wager amounts compared to play with the regular pay table.

The present invention benefits players in that it may provide them with more chances to win large jackpots at a reduced cost per outcome. Players may opt to play to win only jackpots and therefore not waste their time winning and/or losing smaller (possibly insignificant to them) amounts of money. Further, the present invention may allow a player intending to wager only a fixed amount of money, to increase his playing time. Also, a player may be more inclined to remain at a particular gaming device for longer periods of time if he is able to relatively inexpensively "run the cold streaks out" of the gaming device. Players who think of each outcome they purchase from a gaming device as building their equity toward winning a large payout may particularly appreciate the opportunity to quickly generate many outcomes at a reduced cost.

The present invention benefits casinos by increasing individual gaming device playing time. Players may spend longer periods of time playing at one gaming device when they perceive that they can quickly and inexpensively play through a cold streak. The present invention may also result in increased casino revenue due to the player's increased time of play and a greater likelihood of increased customer retention.

A. Terms

Throughout the description that follows and unless otherwise specified, the following terms may include and/or encompass the example meanings provided in this section. These terms and illustrative example meanings are provided to clarify the language selected to describe embodiments of the invention both in the specification and in the appended claims.

The terms "player" and "user" shall be synonymous and may refer to any person or entity that operates a user device, a gaming device, a player device, and/or a user terminal.

The terms "gaming device" and "gaming machine" shall be synonymous and may refer to any electrical, mechanical, electromechanical, software, combination thereof, and/or other device that may accept a wager, may follow a process to generate an outcome, and may pay winnings based on the outcome. The outcome may be randomly generated, as with a slot machine; may be generated through a combination of randomness and user skill, as with video poker; or may be generated entirely through user skill. A gaming device may include any gaming machine and/or system, including slot machines, video poker machines, video bingo machines, video roulette machines, video keno machines, video blackjack machines, pachinko machines, arcade games, video games, pinball machines, skill crane machines, video lottery terminals, online gaming systems, sports betting machines, game consoles, personal computers logged into online gaming sites, gaming device simulations, and the like. Gaming devices may or may not be owned and/or maintained by a casino and/or may or may not exist within a casino location. Gaming devices may be activated by a player pressing a spin button (including bet, wager, deal, start, go, hit, and/or the like buttons), pulling a handle, and/or any other method to initiate the generation of an outcome.

The term “casino” may refer to the owner of gaming devices, owners' agents, and/or any entity who may profit from players' use of the gaming devices.

The term “casino location” may refer to the physical geographic site, complex, or building where gaming devices owned and/or operated by a casino are located. In the case of an online casino, casino location may refer to the address (e.g. the uniform resource locator (URL)) of the online casino's Web site or facility.

The terms “handle pull” and “spin” shall be synonymous and may refer to a single play at a gaming device. In some embodiments, a handle pull may refer to a single complete game (or hand) or in other embodiments, the term may refer to a play related to a single wager. For example, in video blackjack, a user might play a single game in which he splits a pair of sevens, requiring an additional wager. This single game may be considered to include one or multiple handle pulls in different embodiments.

The terms “server” and “casino server” shall be synonymous and may refer to any device that may communicate with one or more one or more gaming devices, one or more third-party servers, one or more remote controllers, one or more player devices, and/or other network nodes, and may be capable of relaying communications to and from each.

The term “user terminal” and “remote controller” shall be synonymous and may refer to any device that may communicate with one or more casino servers, one or more gaming devices, one or more third-party service provider servers, one or more player devices, and/or other network nodes. User terminals may, for example, include personal computers, laptop computers, handheld computers, telephones, kiosks, automated teller machines, gaming devices, game consoles, and/or vending machines. They may include facilities to support secure communications using encryption or the like.

The terms “player device” and “user device” shall be synonymous and may refer to any device owned or used by a user or consumer capable of accessing and/or displaying online and/or offline content. Player devices may communicate with one or more casino servers, one or more gaming devices, one or more third-party service provider servers, one or more user terminals, and/or other network nodes. In some embodiments, player devices may, for example, include gaming devices, personal computers, personal digital assistants, point-of-sale terminals, point of display terminals, kiosks, telephones, cellular phones, automated teller machines (ATMs), pagers, and combinations of such devices.

The term “input device” may refer to a device that is used to receive an input. An input device may communicate with or be part of another device such as a point of sale terminal, a point of display terminal, a user terminal, a server, a player device, a gaming device (e.g. a pressure sensor in a “spin” button on a gaming device), a controller, and the like. Some examples of input devices include: a “spin” or “deal” button and/or a handle on a gaming device, a bar-code scanner, a magnetic stripe reader, a computer keyboard, a point-of-sale terminal keypad, a touch-screen, a microphone, an infrared sensor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, and a weight scale.

The term “output device” may refer to a device that is used to output information. An output device may communicate with or be part of another device (e.g. a gaming device, a point of sale terminal, a point of display terminal, a player device, a casino device, a controller, etc.). Possible output devices include: a cathode ray tube (CRT) monitor, liquid crystal display (LCD) screen, light emitting diode (LED) screen, a printer, an audio speaker, an infra-red transmitter, a radio transmitter.

The terms “I/O device” and “input/output device” shall be synonymous and may refer to any combination of input and/or output devices.

The term “button” may refer to physical buttons, “virtual buttons” displayed as areas on a touch-sensitive or regular display screen, handles, knobs, switches, keys, microphones, levers, joysticks, roller balls, mice, triggers, antennae, coins slots, bill validators, credit card slots, player tracking card slots, disk drives, receptacles, and so on. Thus, the different buttons described below are intended to include any type of input device that can control or otherwise activate (or deactivate) a specified function.

The term “player tracking card” may refer to a device that may be capable of identifying and/or storing information about a consumer who is a casino player. Typically player tracking cards may be accessed by gaming devices and magnetic card readers operated by casino staff. The information stored on the player tracking card may include identifying information, as well as financial information, such as a number of gambling credits remaining. The card may be machine readable, for example, by a gaming device. According to some embodiments of the present invention, a player tracking card may store player and/or membership and/or player preference information. In some embodiments, a player tracking card may simply store a pointer to information on a server.

The term “gross winnings” may refer to a player's total winnings for a session or time period, without regard to the amounts wagered during the session.

The term “net winnings” may refer to a player's total winnings for a session or time period, less the total amount wagered during that time period.

The terms “session,” “gaming session,” “gambling session,” and “play session” shall be synonymous and may refer to a series of plays at one gaming device, a series of plays at multiple gaming devices, and/or a continuous period of time spent gambling in a casino.

The terms “products,” “goods,” “merchandise,” and “services” shall be synonymous and may refer to anything licensed, leased, sold, available for sale, available for lease, available for licensing, and/or offered or presented for sale, lease, or licensing including packages of products, subscriptions to products, contracts, information, services, and intangibles.

The term “merchant” may refer to an entity who may offer to sell, lease, and/or license one or more products to a consumer (for the consumer or on behalf of another) or to other merchants. For example, merchants may include sales channels, individuals, companies, manufacturers, distributors, direct sellers, re-sellers, and/or retailers. Merchants may transact out of buildings including stores, outlets, malls, casinos, and warehouses, and/or they may transact via any number of additional methods including mail order catalogs, vending machines, online web sites, and/or via telephone marketing. Note that a producer or manufacturer may choose not to sell to customers directly and in such a case, a retailer may serve as the manufacturer's or producer's sales channel.

The term "hot period" and "hot streak" shall be synonymous and may refer to a period of a play session during which a player believes or otherwise perceives that a gaming device is producing a higher than normal number of winning outcomes.

The term "cold period" and "cold streak" shall be synonymous and may refer to a period of a play session during which a player believes or otherwise perceives that a gaming device is producing a higher than normal number of losing outcomes.

The term "jackpot" may refer to the highest possible payout which a player may win on a particular gaming device and/or on a progressive gaming device network. A jackpot includes a jackpot amount and in some embodiments a gaming device may be able to award a plurality of different size jackpot amounts for a given handle pull.

The terms "regular pay table" and "regular payout table" shall be synonymous and may refer to the default pay table of a gaming device.

The terms "jackpot only pay table" and "jackpot only payout table" shall be synonymous and may refer to an alternative pay table wherein the only payouts that may be awarded are jackpots and almost all outcomes pay nothing.

The term "jackpot only spin" may refer to a spin or handle pull initiated while a gaming device was configured to use a jackpot only pay table.

The term "jackpot only outcome" may refer to an outcome generated while a gaming device was configured to use a jackpot only pay table.

The term "jackpot only button" may refer to a button, whether mechanical, electronic, or otherwise, which may be used to allow a player to indicate his desire to switch a gaming device's pay table from a regular pay table to a jackpot only pay table.

The term "return to regular play button" may refer to a button, whether mechanical, electronic, or otherwise, which may be used to allow a player to terminate play using a jackpot only pay table and to return to a regular pay table.

The term "automatic spin button" may refer to a button, whether mechanical, electronic, or otherwise, which may be used to allow a player to indicate to a gaming device that he would prefer to enable the gaming device to generate outcomes automatically. The gaming device may then generate a predetermined number of outcomes, generate outcomes for a predetermined amount of time, generate outcomes until a certain number of outcomes that would have been consecutive winning outcomes using the regular pay table are generated, and/or generate outcomes until a threshold is reached that the player perceives as indicative that a cold streak has ended.

The term "automatic spin display" may refer to a display on a gaming device that allows a player to view all outcomes generated as the result of activating an automatic spin button.

The term "jackpot only spin package" may refer to a bundle of outcomes to be generated using a jackpot only pay table and sold for a predetermined price. For example, a player may choose a "Ten Jackpot Only spin package" for $1, or a "Fifty-Five Jackpot Only spin package" for $5, or a "120 Jackpot Only spin package" for $10. Other options may be bundled with a jackpot only spin package such as additional spin offers, marketing offers, bonuses, advertisements, etc.

B. System

Figure 2:
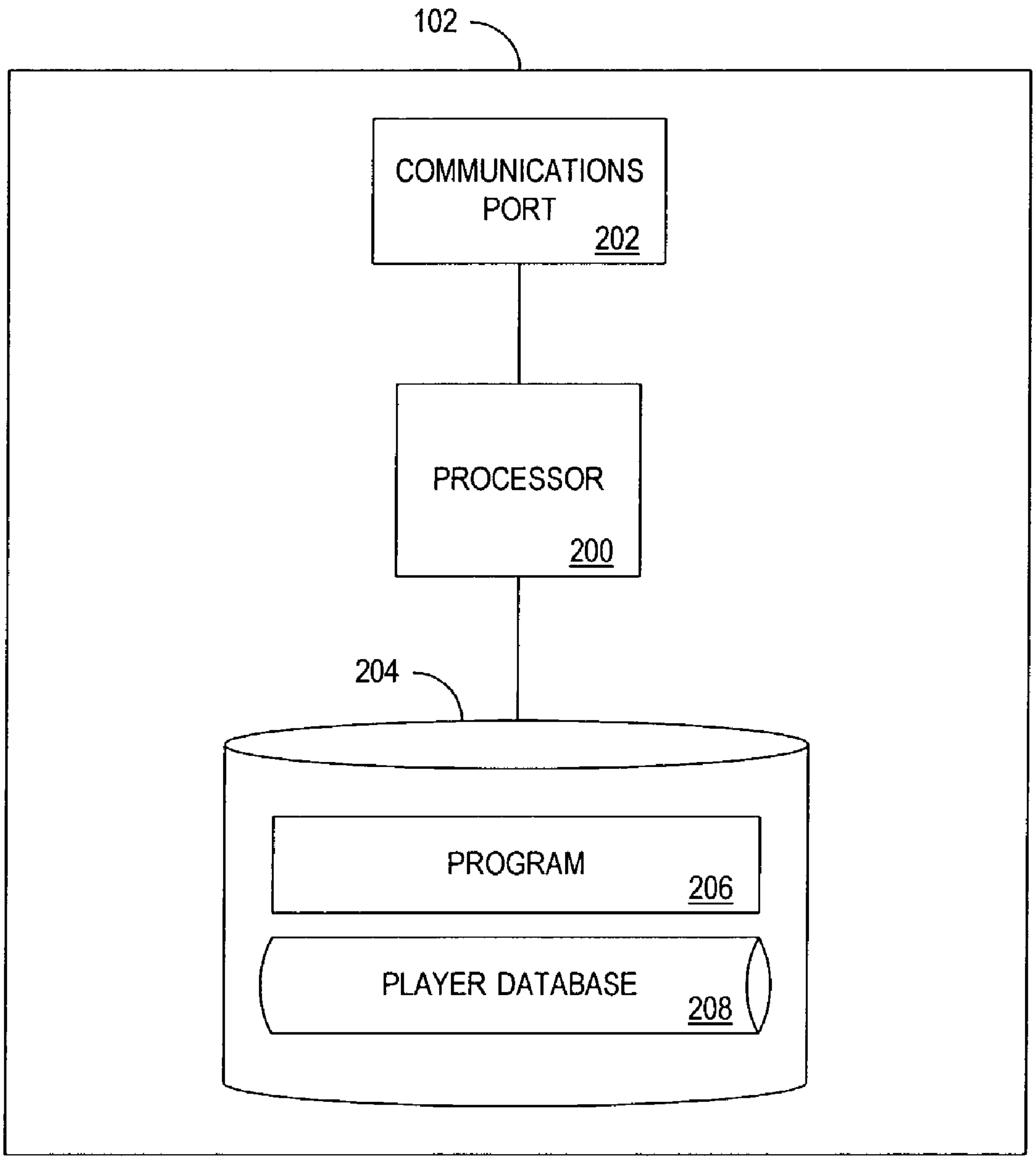
FIG. 2 is a block diagram illustrating an example of the details of a casino server 102 as depicted in FIG. 1 according to some embodiments of the present invention.
Figure 3:
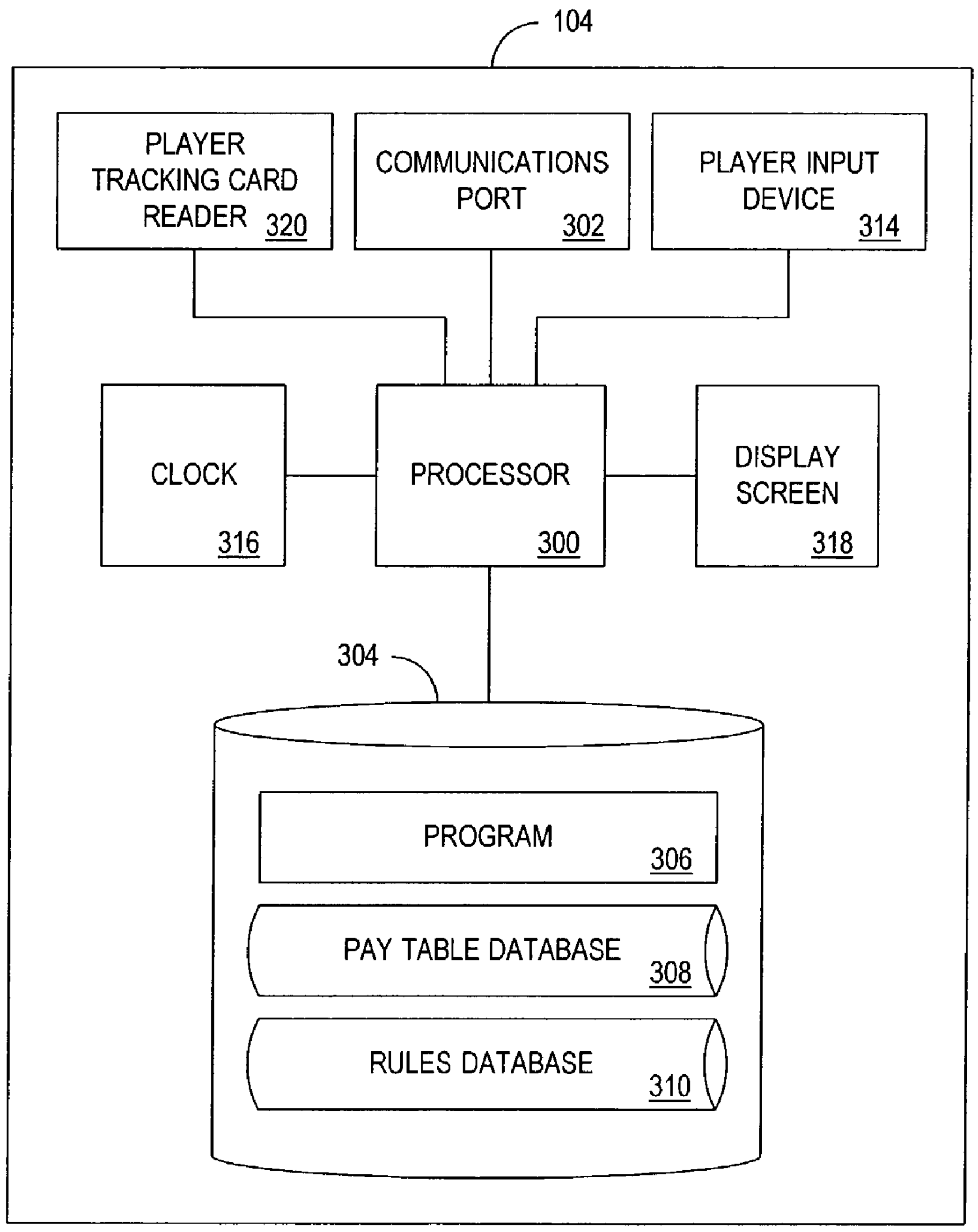
FIG. 3 is a block diagram illustrating an example of the details of a gaming device 104 as depicted in FIG. 1 according to some embodiments of the present invention.

An example embodiment of the system 100 of the present invention is depicted in FIG. 1. The system 100 according to some embodiments of the present invention may include one ore more casino servers 102 (an example of which is depicted in FIG. 2) in one or two-way communication with one or more gaming devices 104 (an example of which is depicted in FIG. 3) via a network such as, for example, the Internet or via another communications link. Although not pictured, other casino devices besides gaming devices 104 may be connected to the casino server 102. Likewise, servers of other casinos and other establishments may be in direct or indirect communication with the casino server 102. Note that in some embodiments, the system may consist of only a gaming device 104.

In operation, the casino server 102 may function under the control of a casino, merchant, or other entity that may also control use of the gaming devices 104. For example, the casino server 102 may be a server in a merchant's network. In some embodiments, the casino server 102 may also be a merchant's server.

In the embodiment pictured in FIG. 1, communication between the casino server 102, the gaming devices 104, and/or third-party servers (not pictured), may be direct and/or via a network such as the Internet. Each of the casino server 102 and the gaming devices 104 may comprise, for example, computers, such as those based on the Intel® Pentium® processor, that are adapted to communicate with each other. Any number of third-party servers (not pictured), external casino servers (not pictured), and/or gaming devices 104 may be in direct or indirect, one or two-way communication with the casino server 102. The casino server 102 and/or the gaming devices 104 may each be physically proximate to each other or geographically remote from each other. The casino server 102 and/or the gaming devices 104 may each include input/output devices.

As indicated above, communication between the casino server 102 and the gaming devices 104 may be direct or indirect, such as over an Internet Protocol (IP) network such as the Internet, an intranet, or an extranet through a web site maintained by the casino server 102 (and/or a third-party server) on a remote server or over an online data network including commercial on-line service providers, bulletin board systems, routers, gateways, and the like. In some embodiments, the nodes may communicate with each other over local area networks including Ethernet, Token Ring, FDDI Full Duplex Technology (FFDT), and the like, radio frequency communications, infrared communications, microwave communications, cable television systems, satellite links, Wide Area Networks (WAN), Asynchronous Transfer Mode (ATM) networks, Public Switched Telephone Network (PSTN), other wireless networks, and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks or months at a time.

The casino server 102 (and/or a third-party server) may function as a "Web server" that presents and/or generates Web pages which are documents stored on Internet-connected computers accessible via the World Wide Web using protocols such as, e.g., the hyper-text transfer protocol ("HTTP"). Such documents typically include one or more hyper-text markup language ("HTML") files, associated graphics, sound, and script files. A Web server allows communication with the casino server 102 in a manner known in the art. The gaming devices 104 may use a web browser, such as NAVIGATOR® published by NETSCAPE® for accessing HTML forms generated or maintained by or on behalf of the casino server 102 and/or a third-party server.

As indicated above, any or all of the casino server 102, a third-party server, and/or the gaming devices 104 may include or be part of, e.g., processor based cash registers, telephones, interactive voice response (IVR) systems such as the ML400-IVR designed by MISSING LINK INTERACTIVE VOICE RESPONSE SYSTEMS, cellular/wireless phones, vending machines, pagers, gaming devices including slot machines, personal computers, portable types of computers, such as a laptop computer, a wearable computer, a palmtop computer, a hand-held computer, a smart card, and/or a Personal Digital Assistant ("PDA"). Further details of the casino server 102 and the gaming devices 104 are provided below with respect to FIGS. 2 through 4.

As indicated above, in some embodiments of the invention, the casino server 102 (and/or a third-party server) may include gaming devices 104. In addition, the casino server 102 may communicate with users directly instead of through the gaming devices 104. Although not pictured, the casino server 102, a third-party server, and/or the gaming devices 104 may also be in communication with one or more consumer and/or merchant credit institutions to effect currency transactions and may do so directly or via a secure financial network such as the Fedwire network maintained by the United States Federal Reserve System, the Automated Clearing House (ACH) Network, the Clearing House Interbank Payments System (CHIPS), or the like.

In operation, the gaming devices 104 (and/or a third-party server) may exchange information about the use of the gaming devices 104 by individual players, data about the players, and the like. In embodiments with a third-party server, the casino server 102 and/or the gaming devices 104 may exchange information about the use of the gaming devices 104 by individual players, data about the players, and the like via the third-party server. The gaming devices 104 may for example, provide information related to the force with which a player presses the gaming devices' buttons to the casino server 102 (and/or a third-party server). The gaming devices 104 may further provide gambling performance and behavior data to the casino server 102 (and/or a third-party server). The casino server 102 (and/or a third-party server) may provide historical information about a player to the gaming devices 104 in the casino location or to remote gaming devices.

C. Devices

FIG. 2 is a block diagram illustrating details of an example of the casino server 102 of FIG. 1 (and/or an example of a third-party server). The casino server 102 is operative to manage the system 100 and execute the methods of the present invention. The casino server 102 may be implemented as one or more system controllers, one or more dedicated hardware circuits, one or more appropriately programmed general purpose computers, or any other similar electronic, mechanical, electromechanical, and/or human operated device.

The casino server 102 (and/or a third-party server) may include a processor 200, such as one or more Intel® Pentium® processors. The processor 200 may include or be coupled to one or more clocks or timers (not pictured) and one or more communication ports 202 through which the processor 200 communicates with other devices such as the gaming devices 104 and/or a third-party server. The processor 200 is also in communication with a data storage device 204. The data storage device 204 may include any appropriate combination of magnetic, optical and/or semiconductor memory, and may include, for example, additional processors, communication ports, Random Access Memory ("RAM"), Read-Only Memory ("ROM"), a compact disc and/or a hard disk. The processor 200 and the storage device 204 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the casino server 102 may comprise one or more computers (or processors 200) that are connected to a remote server computer operative to maintain databases, where the data storage device 204 is comprised of the combination of the remote server computer and the associated databases.

The data storage device 204 stores a server program 206 for controlling the processor 200. The processor 200 performs instructions of the server program 206, and thereby operates in accordance with the present invention, and particularly in accordance with the methods described in detail herein. The present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. The server program 206 may be stored in a compressed, uncompiled and/or encrypted format. The server program 206 furthermore may include program elements that may be generally useful, such as an operating system, a database management system and device drivers for allowing the processor 200 to interface with computer peripheral devices. Appropriate general purpose program elements are known to those skilled in the art, and need not be described in detail herein.

Further, the server program 206 is operative to execute a number of invention-specific, objects, modules and/or subroutines which may include (but are not limited to) one or more routines to identify a player at a gaming device 104; one or more routines to receive information about a user; one or more routines to assess the mood of a player; one or more routines to send signals to a gaming device 104 to switch to using a different pay table; one or more routines to send signals to a gaming device 104 to determine the price to be charged per wager when a jackpot only pay table is used; one or more routines for receiving information from a gaming device 104; one or more routines to store player performance information; one or more routines to store player preference information, one or more routines to facilitate and control communications between gaming devices 104 and/or third-party servers; one or more routines to restore a gaming device 104 to using its default pay table; and/or one or more routines to control databases or software objects that track information regarding users, casinos, merchants supplying prizes, other third-parties, gambling results, gaming devices 104 and awarding prizes. Examples of these routines and their operation are described in detail below in conjunction with the flowchart depicted in FIG. 8.

According to some embodiments of the present invention, the instructions of the server program 206 may be read into a main memory of the processor 200 from another computer-readable medium, such from a ROM to a RAM. Execution of sequences of the instructions in the server program 206 causes processor 200 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

In addition to the server program 206, the storage device 204 is also operative to store a player database 208. The player database 208 is described in detail below and example structures are depicted with sample entries in the accompanying figure.

Turning to FIG. 3, a block diagram depicting an example a gaming device 104 may include a processor 300 coupled to a communications port 302, a data storage device 304, a player input device 314, a clock 316, a display screen 318, a player tracking card reader 320, memory (not pictured), controllers (not pictured), a coin accepter (not pictured), a speaker (not pictured), a random number generator (not pictured), and/or a video camera (not pictured). Although not pictured, the player input device 314 may include a pressure sensor, which may also be coupled to the processor 300, for measuring force used when a player provides input to the gaming device 104. A pressure sensor may include any number of different types of strain gages that measure an amount of deflection (and/or a change in electrical resistance) of an elastic element as it is stretched or compressed, as are well known in the art. Such pressure sensors are operable to generate a signal that may be transmitted to the processor 300 and interpreted as representative of an amount of force applied to the attached player input device measured, for example, in Newtons.

The data storage device 304 stores a gaming device program 306 (hereinafter "program 306") for controlling the processor 300. The processor 300 performs instructions of the program 306, and thereby operates in accordance with the present invention, and particularly in accordance with the methods described in detail herein. As with the casino server program 206 described above, the program 306 may be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. The program 306 may be stored in a compressed, uncompiled and/or encrypted format. The program 306 furthermore may include program elements that may be generally useful, such as an operating system, a database management system and device drivers for allowing the processor 300 to interface with computer peripheral devices. As stated above, appropriate general purpose program elements are known to those skilled in the art, and need not be described in detail herein.

Further, as with the server program 206 described above, the program 306 may be operative to execute a number of invention-specific, objects, modules and/or subroutines which may include (but are not limited to) one or more routines to identify a player at the gaming device 104; one or more routines to receive information about a user; one or more routines to assess the mood of a player; one or more routines to implement rules regarding switching pay tables; one or more routines to switch from using a first pay table to using a second pay table; one or more routines to receive signals from a casino server 102 to switch pay tables; one or more routines to send information to a casino server 102; one or more routines to determine (or receive from the casino server 102) the price to be charged per wager when a jackpot only pay table is used; one or more routines to store player performance information; one or more routines to store player preference information, one or more routines to facilitate and control communications between the gaming device 104 and/or third-party servers; one or more routines to restore the gaming device 104 to using its default pay table; and/or one or more routines to control databases or software objects that track information regarding users, casinos, merchants supplying prizes, other third-parties, gambling results, other gaming devices, and awarding prizes. Examples of these routines and their operation are described in detail below in conjunction with the flowchart depicted in FIG. 8.

As with the server program 206, according to some embodiments of the present invention, the instructions of the program 306 may be read into a main memory of the processor 300 from another computer-readable medium, such from a ROM to a RAM. Execution of sequences of the instructions in the program 306 causes processor 300 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

In addition to the program 306, the storage device 304 is also operative to store (i) a pay table database 308 and (ii) a rules database 310. The databases 308, 310 are described in detail below and example structures are depicted with sample entries in the accompanying figures.

As will be understood by those skilled in the art, the schematic illustrations and accompanying descriptions of the sample databases presented herein are exemplary arrangements for stored representations of information. Any number of other arrangements may be employed besides those suggested by the tables shown. For example, even though three separate databases are illustrated, the invention could be practiced effectively using one, two, four, five, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention. These processes are described below in detail with respect to FIG. 8.

Although the databases 308, 310 are depicted as residing on the gaming device 104, it should be understood that these databases 308, 310 could just as easily be implemented, on the casino server 102. Likewise, a gaming device 104 could store a player database 208. A casino server 102 may store a redundant copy of the gaming devices' databases 308, 310 to protect against data loss or for any number of other reasons. In embodiments in which, for example, the casino server 102 serves/controls multiple casinos operated by different entities, a casino may wish to have a local copy of the portions of the databases 308, 310 that include entries related to that casino and exclude other casinos' access to that casino's information. Further, in some embodiments of a gaming device 104 according to the present invention there may be included local copies of some portions of the databases 308, 310 of other gaming devices. Such a redundant configuration may provide enhanced system performance by reducing network communications. A program 306 may include one or more routines to respond to requests from other gaming devices for player session data, player preference data, and player performance information. Such a distributed configuration may provide enhanced system security by allowing different casinos to store and maintain their own databases. In some embodiments, local versions of the databases 308, 310 are not stored on the gaming devices 104 at all and instead, the gaming device program 306 accesses casino server databases (that are equivalent to databases 308, 310) which are stored and maintained on the casino server 102. Likewise, in some embodiments, the databases may only exist on a third-party server and thus, both the casino server 102 and the gaming devices 104 may access a third-party server for the data. Thus, the databases 208, 308, 310 may be stored anywhere within the system 100 that is practicable.

Figure 4:
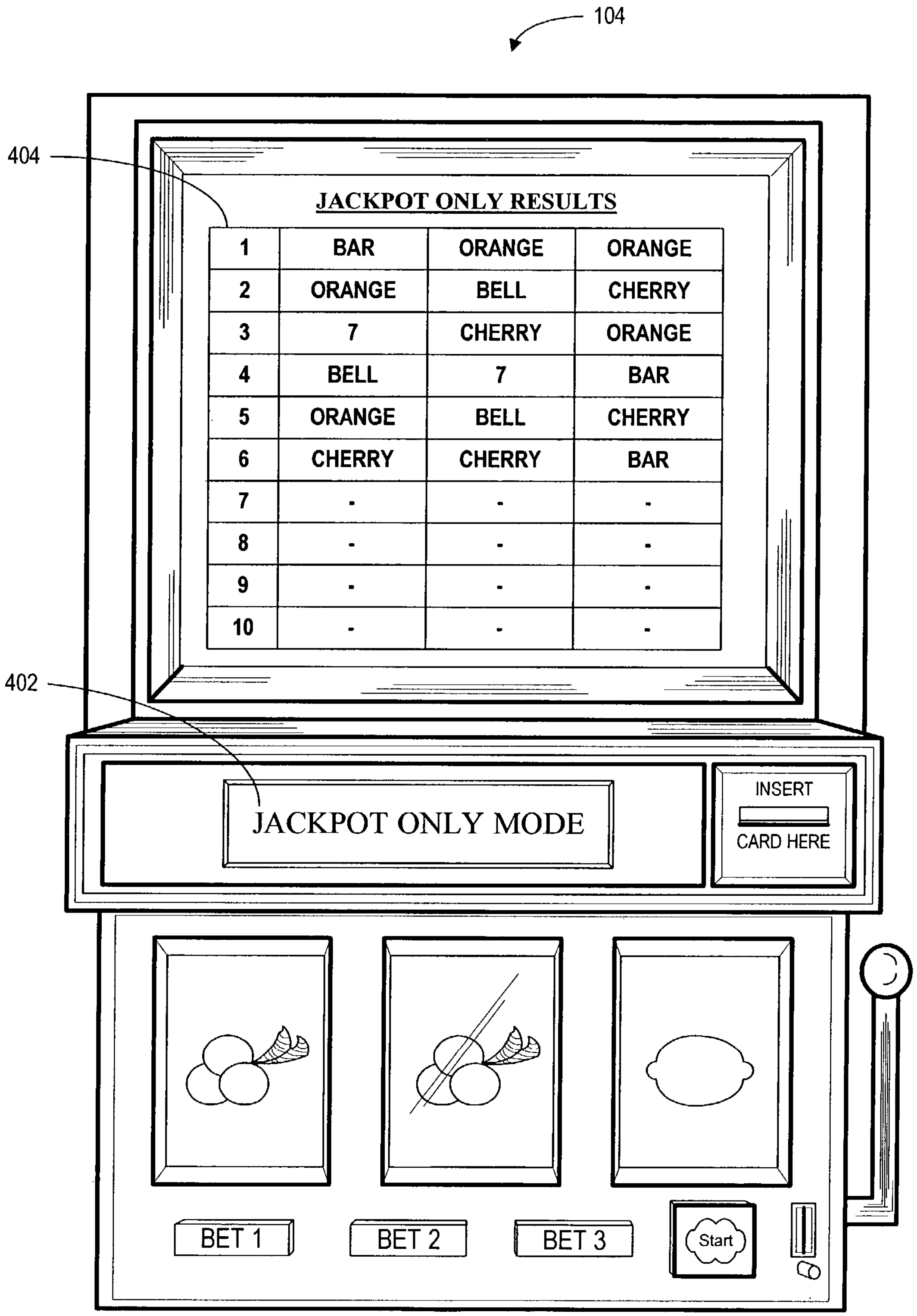
FIG. 4 is a diagram illustrating an example of the external appearance of a gaming device 104 as depicted in FIG. 1 according to some embodiments of the present invention.

Turning to FIG. 4, an illustration of an example of the exterior of a gaming device 104 according to some embodiments of the present invention is depicted. In some embodiments, the player input device 314 may include a jackpot only button 402. A jackpot only button 402 may be used to allow a player to activate a jackpot only mode wherein the gaming device 104 uses a jackpot only pay table. A jackpot only button 402 may become illuminated or it might flash when the gaming device 104 offers the player the option of using a jackpot only pay table. In some embodiments, a jackpot only button 402 may be illuminated or flashing when the gaming device is actually using a jackpot only pay table. Although not pictured, a gaming device according to the present invention may include a "return to regular play" button that a play may used to switch a gaming device 104 back to using a regular pay table. In embodiments without a "return to regular play" button, a jackpot only button 402 may be used to toggle between a jackpot only pay table and a regular pay table.

A gaming device according to the present invention may also include an automatic spin display 404 and/or an automatic spin button (not pictured). An automatic spin display 404 may provide a player with a view of all or several outcomes at once when the machine is operating in an automatic spin mode. Thus, a player may very quickly experience many outcomes without having to wait for each outcome to resolve on a conventional display. In some embodiments, an automatic spin display 404 may merely serve as a record of past outcomes for a player to reference while the reel display continuous displays new outcomes as they are generated. In some embodiments, an automatic spin display 404, such as that illustrated in FIG. 4, may be implemented via a representation on the gaming device's display screen 318 and in some embodiments, an additional display added to a modified conventional gaming device may provide an automatic spin display 404. An automatic spin button (not pictured) may be provided to allow a player to activate an automatic play mode. Along with an automatic spin button, a gaming device may include multiple related buttons that allow a player to select how long or how many handle pulls the gaming device is to spin automatically.

In some embodiments, the jackpot only button 402 and/or the automatic spin button(s) may only be enabled after the gaming device 104 determines that the player perceives that the gaming device 104 is in a cold period and/or after the gaming device 104 determines that the player has become frustrated.

D. Databases

As indicated above, it should be noted that although the example embodiments depicted in FIGS. 2 and 3 include three particular databases stored in storage devices 204, 304, other database arrangements may be used which would still be in keeping with the spirit and scope of the present invention. In other words, the present invention could be implemented using any number of different database files or data structures, as opposed to the three depicted in FIGS. 2 and 3. Further, the individual database files could be stored on different devices (e.g. located on different storage devices in different geographic locations, such as on a third-party server). Likewise, the programs 206, 306 could also be located remotely from the storage devices 204, 304 and/or on another server. As indicated above, the programs 206, 306 may include instructions for retrieving, manipulating, and storing data in the databases 208, 308, 310, as may be useful in performing the methods of the invention as will be further described below.

1. Player Database

Turning to FIG. 5, a tabular representation of an embodiment of a player database 208 according to some embodiments of the present invention is illustrated. This particular tabular representation of a player database 208 includes three sample records or entries which each include information regarding a particular player of a gaming device 104. In some embodiments of the invention, a player database 208 is used to player data including identification number, name, address, "comp" points, and gambling data. Those skilled in the art will recognize that such a player database 208 may include any number of entries or additional fields.

The particular tabular representation of a player database 208 depicted in FIG. 5 includes five fields. The fields may include: (i) a player tracking number field 500 that may store a representation uniquely identifying the player using the gaming device; (ii) a player name field 502 that may store a representation of the player's name; (iii) an address field 504 that may store a representation of the player's address; (iv) a comp points field 506 that may store a representation of a current balance of a player's comp points; and (v) a gambling data field 508 that may store a representation of the player's recent gambling performance and/or related behavior.

The example player database 208 depicted in FIG. 5 includes example data to illustrate the meaning of the information stored in this database embodiment. A player identifier 500 (e.g. "4127," "4128," "4129") may be used to identify and index players listed in the player database 208. In this example, "4127" identifies a player named "Bob Smith," "4128" identifies a player named "Jim Red," and "4129" identifies a player named "Joe Green" as indicated by the player name field 502. According to the sample data, Bob Smith lives at "125 Main St., Anytown, Conn.," currently has a balance of "1,235" comp points and is a "high roller." Jim Red lives at "187 Long Rd., Small Town, N.Y.," currently has a balance of "462" comp points, and has "lost [on the] last three spins." Joe Green lives at "235 Willow Dr., Big City, Calif.," currently has a comp point balance of "990," and has "lost $27 so far this session."

2. Pay Table Database

Turning to FIG. 6, a tabular representation of an embodiment of a pay table database 308 according to some embodiments of the present invention is illustrated. This particular tabular representation of a pay table database 308 includes eighteen sample records or entries which each include payout and other information for possible corresponding outcomes a gaming device 104 might generate. In some embodiments of the invention, a pay table database 308 is used to store a list of the combinations of reel elements that make up each outcome, an "expected hit" value for each outcome, a regular payout amount for each outcome, and a jackpot only payout amount for each outcome. Those skilled in the art will recognize that such a pay table database 308 may include any number of entries or additional fields.

The particular tabular representation of a pay table database 308 depicted in FIG. 6 includes four fields. The fields may include: (i) an outcome field 600 that may store a representation identifying an outcome or a set of outcomes; (ii) an expected hits field 602 that may store a representation of the number of times the corresponding outcome would be expected to be generated if the gaming device was spun a number of times equal to the number of all the possible outcomes (e.g. 10,648 times, as discuss below), (iii) a regular payout field 604 that may store a representation of the amount that would normally be paid out by the gaming device 104 if the corresponding outcome was generated; and (iv) a jackpot only field 606 that may store a representation of the amount that would be paid out if the gaming device is operating using the jackpot only pay table and the corresponding outcome was generated.

The example pay table database 308 depicted in FIG. 6 provides example data to illustrate the meaning of the information stored in this database embodiment. For example, the outcome "CHERRY/ANY/ANY" that is expected 680 times out of 10,648 handle pulls, normally pays two credits but pays nothing when the jackpot only pay table is used. Note that all outcomes except "7/7/7" pay nothing when the jackpot only table is used. The "7/7/7" outcome is a jackpot winning outcome that pays 100 credits regardless of which pay table is used.

Collectively, the particular example data in the regular payout field 604 of the pay table database 308 shown in FIG. 6 is modeled after a twenty-two stop, three reel device having 10,648 unique outcomes. The outcomes illustrate groupings of reel symbol results that correspond to specific coin payouts. The outcome CHERRY/CHERRY/ANY, for example, may indicate a grouping of all reel symbol results in which the first two reels show a CHERRY symbol and the third reel shows any symbol. As shown in FIG. 6, this particular outcome is associated with a regular payout of five coins and an expected hits of 200 (indicating that this outcome will appear 200 times per complete cycle). It should be noted that not all of the outcomes may result in a coin payout. The "OTHER" outcome may not have a coin payout, and is in fact the most common outcome for this particular payout table (with 8,570 hits per cycle of 10,648 spins). This particular payout table represents a slot device with a 94.5% payback to the player. More information about such pay tables and gaming devices may be found in "Winning at Slot Devices" by Jim Regan, published by Carol Publishing Group which is incorporated herein for all purposes.

Compared to the pay table represented by the example data in the regular payout field 604, the pay table represented by the example data in the jackpot only payout field 606 has had all of the lower end payouts eliminated. Only the payout of one hundred coins for the "7/7/7" outcome has been preserved. With the elimination of the lower payouts, this "jackpot only" pay table represents a payback of only 0.94% (approximately one coin of payout for each one hundred coins wagered). One of the advantages of this pay table may be that the top payout of one hundred coins is attractive to players, while the 0.94% payback represents a low cost to the casino and may allow the casino to require much smaller wager amounts.

Many other payout configurations are possible for the jackpot only payout table. For example, instead of a payout for only a single outcome there may be payouts for a few of the outcomes. In such an embodiment the jackpot amounts may be reduced (or increased) compared to the regular pay table. In some embodiments, jackpot winning outcomes may correspond to a plurality of different outcome symbol combinations. In some embodiments, the jackpots may include a plurality of jackpot amounts. In such embodiments, a jackpot amount may be considered any amount greater than a predefined multiple of standard deviations of the average payout amount of the regular pay table. In some embodiments, the average payout amount of the regular payout table may be computed based the average of all possible payout amounts specified in the regular payout table. In some other embodiments a weighted average of all possible payout amounts specified in the regular payout table may be used where the weighting is based upon the probability associated with each payout, amount in the regular payout table. In some embodiments where the jackpots include a plurality of jackpot amounts, a particular jackpot amount for each jackpot is simply defined as an amount greater than a predefined amount. For example, all payouts with an amount greater than $10,000.00 are jackpots. In some embodiments, instead of paying only for the outcome that normally wins the top payout on the regular pay table, there could be a payout only for one of the common low end outcomes, for example, CHERRY/CHERRY/ANY.

Note that a casino may make nearly equivalent amounts of profit on a per spin basis for these two different pay tables. A player betting a single dollar coin each spin using the regular payout table would, on average, generate 5.5 cents per pull in profit for the casino:

$$((1-0.945)\times\$1)=\$0.055$$

A player buying ten outcomes using the jackpot only pay table for $1.00 would be paying ten cents per pull. This would generate 9.9 cents per pull in profits to the casino:

$$((1-0.0094)\times\$0.10)=\$0.099$$

Thus, by varying the size of the jackpot amount on the jackpot only pay table, or by changing the size of the wager required for each spin using the jackpot only pay table (or pay table probabilities), a casino could make the profit rate differential between spins using the regular and jackpot only pay tables arbitrarily small or even make a jackpot only spin more advantageous to the player. For example, in some embodiments the casino could choose a pay table and jackpot amount that results in a positive expected value to the player.

3. Rules Database

Turning now to FIG. 7, a tabular representation of an embodiment of a rules database 310 according to some embodiments of the present invention is illustrated. This particular tabular representation of a rules database 310 includes sample records or entries which each include information regarding the details of a rule used in determining when to offer a player an opportunity to switch a gaming device to using a jackpot only pay table. In some embodiments of the invention, a rules database 310 may specify that when certain predefined thresholds are met or exceeded, the gaming device may offer a player an opportunity to switch to using a jackpot only pay table. The predefined thresholds may include, for example, a certain number of consecutive losing spins, a particular size loss within a predefined time period, a particular rate of play, a certain comp point balance, a certain time of day, a certain number of excess button presses, a certain amount of force used to press buttons or pull handles, a certain amount of time between button presses, and a certain length of time buttons are held down. Those skilled in the art will recognize that such a rules database 310 may include any number of entries or additional fields.

The particular tabular representation of a rules database 310 depicted in FIG. 7 includes two fields for each of the entries or records. The fields may include (i) a rule identifier field 700 that may store a representation that uniquely identifies a particular rule and (ii) a description field 702 that may store a representation describing the rule in terms of, for example, a threshold that must be met or exceeded before the rule will trigger the gaming device to offer to allow the player to switch the gaming device 104 to use a jackpot only pay table.

The example rules database 310 depicted in FIG. 7 provides example data to illustrate the meaning of the information stored in this database embodiment. The example data provides six example rules.

The first example rule (R001) provides that if the player experiences ten consecutive losing outcomes, he may be presented with the opportunity to switch the gaming device to use a jackpot only pay table.

The second example rule (R002) provides that if the player lost more than $20 in ten minutes, he may be presented with the opportunity to switch the gaming device to use a jackpot only pay table.

The third example rule (R003) provides that if the player maintains a rate of 500 handle pulls per hour for a predefined amount of time, he may be presented with the opportunity to switch the gaming device to use a jackpot only pay table.

The fourth example rule (R004) provides that five different players may be randomly selected per week to be presented with the opportunity to switch the gaming device to use a jackpot only pay table.

The fifth example rule (R005) provides that if the player's gambling data indicates that he is a "high roller," he may be presented with the opportunity to switch the gaming device to use a jackpot only pay table.

The sixth example rule (R006) provides that if the casino is running a promotion to introduce a new gaming machine, all players may be presented with the opportunity to switch the gaming device to use a jackpot only pay table.

E. Process Descriptions

The system discussed above, including the hardware components and the databases, are useful to perform the methods of the invention. However, it should be understood that not all of the above described components and databases are necessary to perform any of the present invention's methods. In fact, in some embodiments, none of the above described system is required to practice the present invention's methods. The system described above is an example of a system that would be useful in practicing the invention's methods. For example, the player database 208 described above with respect to FIG. 5 is useful for tracking, aggregating, and analyzing information about a player's gambling experience, but it is not absolutely necessary to have such a database in order to perform the methods of the invention. In other words, the methods described below may be practiced by, for example, a casino hostess who interacts with players in person and manually enables a jackpot only button based on her own observations.

Figure 8:
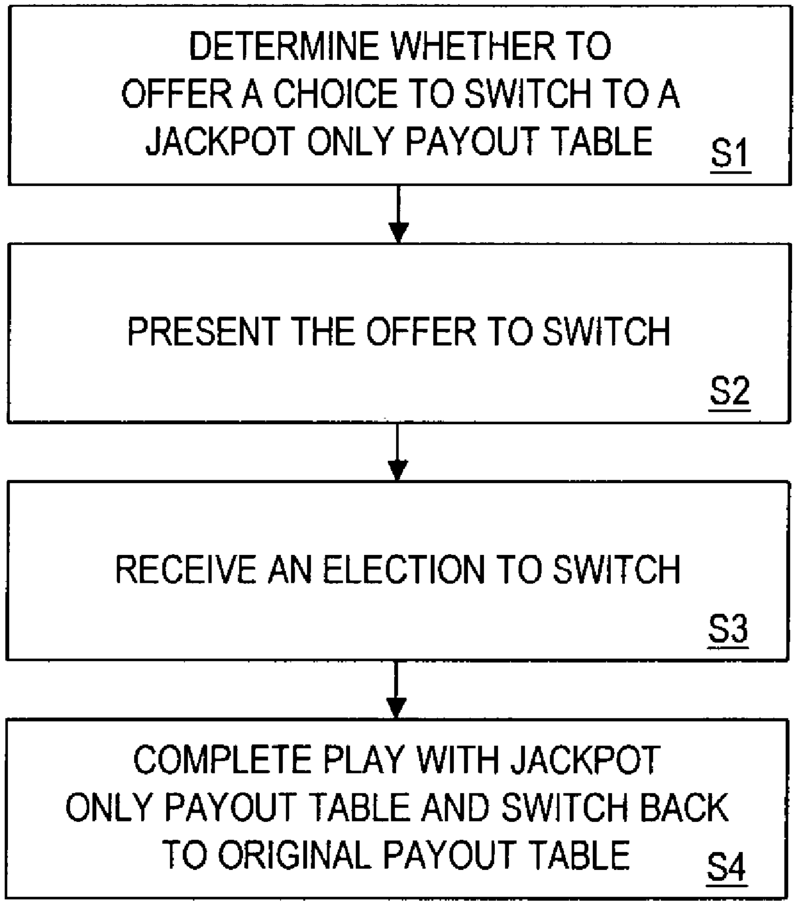
FIG. 8 is a flow diagram illustrating an exemplary process for facilitating modification of a pay table according to and for use in some embodiments of the present invention.

Referring to FIG. 8, a flow chart is depicted that represents some embodiments of the present invention that may be performed by the casino server 102, a gaming device 104, and/or the casino. It must be understood that the particular arrangement of elements in the flow chart of FIG. 8, as well as the number and order of example steps of various methods discussed herein, is not meant to imply a fixed order, sequence, quantity, and/or timing to the steps; embodiments of the present invention can be practiced in any order, sequence, and/or timing that is practicable. Likewise, the labels used to reference the individual steps of the methods are not meant to imply a fixed order, sequence, quantity, and/or timing to the steps.

In general terms and referring to FIG. 8, method steps of an embodiment of the present invention may be summarized as follows. In Step S1, the system 100 determines whether to offer a player of a gaming device 104 the choice to switch the gaming device 104 to use a jackpot only pay table. In Step S2, an offer to switch is presented to the player. In Step S3, the player's election to switch is received and in Step S4, the gaming device operates using the jackpot only pay table until a termination condition is reached and then switches back to using a regular pay table.

In the subsections that follow, each of these steps will now be discussed in greater detail. Note that not all of these steps are required to perform the methods of the present invention and that additional and/or alternative steps are also discussed below. Also note that the above general steps represent features of only some of the embodiments of the present invention and that they may be combined and/or subdivided in any number of different ways so that methods of the present invention include more or fewer actual steps. For example, in some embodiments many additional steps may be added to update and maintain the databases described above, but as indicated, it is not necessary to use the above described databases in all embodiments of the invention. In other words, the methods of the present invention may contain any number of steps that are practicable to implement the several different inventive processes described herein.

1. Determine Whether to Offer a Choice to Switch to a Jackpot Only Payout Table

In Step S1, a gaming device 104 (or casino server 102) makes a determination that a player is to be offered the opportunity to play with a jackpot only pay table. Many factors may be considered in making this determination however, in some embodiments, players may always have the option to play with a jackpot only pay table. In some embodiments, presenting the option of jackpot only play may be limited to instances when the casino wants to reward a player or provide a special incentive to a player. The rules database 310 of FIG. 7 provides a few specific examples of different bases to grant a player the use of a jackpot only pay table. Additional bases include: a player wagers a predefined amount within a predefined period, a player gets a predefined number of losing spins in a row, a player loses more than a predefined gross amount of money in a predefined number of handle pulls or within a predefined amount of time, a player's net winnings after a predefined period is less than a predefined amount, a player's rate of play drops below a predefined number of handle pulls per hour, a player's rate of play exceeds a predefined rate of play, a player is playing a new type of gaming device that the casino wants to promote, a casino is running a promotion, a casino chooses to reward a particular player and/or groups of players, a casino randomly awards players at a predefined rate as a customer retention incentive or a comp award, and/or gambling history/behavior from a player database 208.

Thus, determining when to offer a player the option of jackpot only pay table play may include monitoring a player's gambling until the player's experience results in a predefined threshold being met or exceeded. In some embodiments, the determination may be made based upon observed behavior of the player. For example, if a player appears bored (e.g. his gaze is not focused on the gaming device) or is acting frustrated (e.g. he is hitting the spin button unnecessarily hard), a gaming device 104 (or the casino server 102 or casino) may decide to attempt to recapture his interest or placate him by presenting the opportunity to switch to using a jackpot only pay table.

2. Present the Offer to Switch

In Step S2, a gaming device 104 (or a casino server 102 or a casino) may present a player with the option to switch to using a jackpot only pay table. This may be done in any number of different ways. For example, the player may be presented with a jackpot only options selection screen. In some embodiments, a video display screen separate from (or attached to) a gaming device may display the option to switch to using a jackpot only pay table. In some embodiments, a customized greeting based on information ascertained from the player's player-tracking card or from the player database 208 may be used to present the offer to switch. For example, the display screen 318 might display text that states:

> Hello Mr. Bob Smith, you have been chosen to receive the option of playing for this slot machine's Jackpot at a reduced cost; only 20 cents per handle pull. Note that in jackpot only mode, outcomes other than 7/7/7 do not pay a prize. Please indicate whether you would like to play for the Jackpot only by pressing the flashing "Jackpot Only Mode" button below.

In some embodiments, a menu-driven selection screen which may allow a player to indicate how much he would like to spend on the Jackpot Only Spin session may be used. Options may include a $1, $5, or $10 selection. Buttons may be located on the gaming device's touch-sensitive video display screen and may be used via a graphic interface and/or buttons may be located on the exterior casing of the gaming device. In some embodiments, detailed instructions describing how a jackpot only mode works may be provided. As indicated above, the gaming device may include or display accept and/or reject buttons to allow a player to indicate if he would like to proceed with a session using a jackpot only pay table.

In some embodiments, a gaming device 104 may determine a discounted wager amount associated with single-spin use of the jackpot only pay table and/or a predefined number of automatic spins using a jackpot only pay table. For example, the gaming device 104 may associate a reduced wager amount (e.g. $0.20) for a handle pull wherein a jackpot only pay table is in use. In some embodiments, a reduced wager amount (e.g. a $1 package price) may be associated with a predefined number of spins (e.g. 10 spins). In some embodiments, the discounted wager amount for use with a jackpot only pay table may be predetermined and fixed. In alternative embodiments, the discounted wager amount for use with a jackpot only pay table may be determined dynamically based upon many different factors such as, for example, the player's comp point balance, gambling history and/or performance, the amount of incentive a casino wants to provide at a given time, and/or the time of day. Whatever wager amount the system 100 determines to charge for play with a jackpot only pay table, the wager amount may also be displayed when a player is offered the option to switch pay tables. For example, along with a greeting as above, a player may additionally be presented with the following display on a touch-sensitive display screen 318:

| Jackpot Only Spin Packages | |
|---|---|
| $1 | 10 Jackpot Only Spins |
| $5 | 55 Jackpot Only Spins |
| $10 | 120 Jackpot Only Spins |
| Select A Number of Jackpot Only Spins | |

In some embodiments, a player may opt to specify the number of jackpot only spins he desires in terms of a performance measure. For example, a player may indicate via a selection screen that he wants the gaming device to continue spinning using the jackpot only pay table until the gaming device consecutively generates five outcomes that together would normally payout $50 if the regular pay table was used. Another example might be that the player specifies that the gaming device should continue spinning using the jackpot only pay table until fifty outcomes are generated that together would normally payout $5 or less if the regular pay table was used. This type of specification of a number of jackpot only spins may allow a player to perceive that he is "running the cold streak out of the machines." In some embodiments, a player may be asked indicate if he would like the gaming device to switch to using a jackpot only pay table by merely specifying a rate at which jackpot only spins are to be generated. In such embodiments, the player will be able to watch the outcomes as they are generated, decide if the gaming device has exited a cold period, and then manually stop the automatic spins by pressing a halt button.

3. Receive an Election to Switch

In Step S3, the player's response to the offer to switch the gaming device 104 to use a jackpot only pay table is received. This may be done in a number of different ways. For example, a player may press, click, and/or select a jackpot only button located on the gaming device's touch-sensitive video display, on the exterior casing of the gaming device, and/or on a graphic interface located on the gaming device's display screen 318. A player may signal his election via a textual entry such as through the use of a keyboard, mouse, etc. In some embodiments, the system may receive a player's election via speech recognition software, a video camera, a handheld personal computer or other communication device such a palm pilot, personal computer, cellular telephone, beeper, gaming device remote control, internet and/or intranet connection, satellite transmission, or any other input device. In some embodiments, a gaming device may merely receive a selection of a jackpot only spin package as an indication of an election to switch.

Upon receiving the player's election to switch to using a jackpot only pay table, the gaming device 104 may automatically deduct the appropriate wager amount from the player's stored credits and/or request that the player insert the necessary wager amount. The gaming device 104 may internally transfer payout values from the jackpot only field 606 of the pay table database 308 into memory locations that payment routines of the gaming device 104 reference to determine a payout once an outcome is generated. Additionally, other components of the gaming device 104 may be disabled to allow the gaming device to function in an automatic spin mode. For example, the gaming device 104 may disable a requirement for a wager for each spin so as to allow the gaming device 104 to operate for 10 spins without requiring payment by the player other than an initial $1 wager for a package of spins.

4. Complete Play with the Jackpot Only Payout Table

In Step S4, play using a jackpot only pay table is initiated and completed. In some embodiments, a player may manually press the spin button as many times as he wants outcomes generated with the jackpot only pay table. When the player is satisfied that the gaming device is out of the cold period, he may simply press a "return to regular play" button.

In embodiments where a player has elected to use an automatic spin feature, the gaming device 104 may automatically spin for a predefined amount of time, it may spin all of the player's predefined number of jackpot only spins within a predetermined period of time, and/or it may spin until some other predefined condition is satisfied. For example, the gaming device may automatically spin all of a player's ten jackpot only spins within ten seconds. In some embodiments, the gaming device 104 may spin all of a player's jackpot only spins within one second and/or within a fraction of a second. A player may opt to use automatic spinning to complete the process as quickly as possible.

In some embodiments, the gaming device 104 may utilize an automatic spin display 404. In such embodiments, an automatic spin display may appear as the primary information on the gaming device's display screen 318 (as depicted in the embodiment of FIG. 4) and/or as small window within the gaming device's display screen 318 located, for example, in the lower right hand corner of the display screen 318. In some embodiments, an automatic spin display may include an auxiliary display device attached to, or separate from, the gaming device 104. A purpose of an automatic spin display 404 may be to facilitate simultaneously and/or rapid display of multiple outcomes in list form as they are generated while a jackpot only pay table is in use. One of the advantages of such embodiments is that the player who does not happen to see one (or more) of his outcomes (perhaps due to an interruption by a friend) at the time it was generated, can subsequently find that outcome on the list. In some embodiments where a very large number of outcomes are to be displayed, an automatic spin display 404 may reveal an entire screen-full of outcomes simultaneously while in other embodiments, each outcome may be revealed one at a time.

In embodiments where a player manually spins all of his purchased jackpot only spins or as many as he would like, the gaming device may be equipped with a timer that displays, for example, a countdown until the gaming device 104 will switch back to using the regular pay table and the player forfeits any unused pre-purchased jackpot only handle pulls. Such embodiments may be useful to help the player maintain a reasonable pace. These embodiments may be particularly useful with gaming devices not equipped with video display reels (e.g. mechanical three reel slot machines) that must actually spin physical reels to generate outcomes. However, as in previous embodiments, a time keeping mechanism may exist so as to prevent the player from taking too much time when making manual handle pulls using a jackpot only pay table.

In some embodiments, a player may manually end his use of a jackpot only pay table before all of his pre-purchased jackpot only spins have been completed. This may occur, for example, in the case where a player would like to end his jackpot only spin session in order to play using the regular pay table. For example, a player may purchase a $5.00, 55 jackpot only spin package but decide during the middle of an automatic spin session that the bad luck has been run out of the gaming device 104 and that he would like to return to the regular payout table immediately. In this embodiment, a player may select a "return to regular pay table" button which, in some embodiments, may be located on the gaming device's display screen 318. In the event that a player decides to manually end his jackpot only session, the balance of the player's pre-purchased jackpot only spin package may be credited back to the player based on the number of unused jackpot only spins and/or the balance may be stored for later use. In embodiments where a player's jackpot only spins are saved for a later use, the player may later access his jackpot only spins, for example, by entering a code into the gaming device.

In some embodiments, upon the completion of a player's jackpot only spin session, the gaming device 104 may automatically switch from using the jackpot only pay table back to using the regular pay table. In such embodiments, the processor 300 of the gaming device 104 may re-enable the payment requirement for each spin if it had previously been disabled. In some embodiments, a casino server 102 may automatically switch a gaming device 104 from using the jackpot only pay table to using the regular pay table by transmitting a control signal from to the gaming device's processor 300 which may indicate that the jackpot only pay table should be replaced by the regular pay table.

In some embodiments, upon the completion of a player's jackpot only spin session, a player may be asked if he would like to purchase additional jackpot only outcomes. In some embodiments, a gaming device may automatically switch back to using a regular pay table if a player hits a jackpot, a predefined amount of time using the jackpot only pay table has elapsed, and/or a predefined maximum permitted number of jackpot only spins is reached.

F. Example Illustrative Embodiments of the Invention

The following very specific examples are provided to illustrate particular embodiments of the present invention, particularly from the perspective of potential users of the system 100, including players and casinos.

(a) Example 1

A player gambles at a slot machine for an hour and wins a small sum of money. He considers quitting, but has a feeling that the device is about to hit a top jackpot. However, the player does not want to continue playing and risk losing the small win that he has already accumulated. The player instead opts for a series of jackpot only spins in which he pays a reduced price per spin and gets the opportunity to play only for the jackpot that he perceives is "over due." The player gets the enjoyment of pursuing the jackpot at a much reduced cost without risking losing his prior winnings. Upon the player pressing a "jackpot only mode" button 402, the gaming device 104 switches pay tables to a jackpot only pay table and the player begins a jackpot only spin session.

(b) Example 2

A player approaches a gaming device and inserts a $100 bill into the bill validator. After playing for a couple of hours, the player realizes that except for one $75 payout, the majority of his outcomes have been losing ones. Determining that his gaming device 104 may be going through a cold period, the player becomes frustrated and considers leaving to go play a luckier gaming device at a different casino. However, before leaving the player notices a pop-up display that indicates that for a reduced cost, he can run the bad luck out of the device by only playing for the jackpot.

Intrigued, the player selects the jackpot only button and $1 is automatically withdrawn from his stored credits. The player is then given ten jackpot only spins and the gaming device 104 automatically switches from using a first payout table to using a second payout table. Next, the gaming device 104 displays a counter indicating that there are ten spins remaining, and then the player proceeds to hit the spin button until he has no spins left. Upon the completion of ten jackpot only spins, the gaming device automatically returns to the first payout table.

(c) Example 3

A player selects the jackpot only button and is presented with an instruction screen which instructs the player to select from one of the many jackpot only spin packages which are sold at a discounted rate such as $1 for ten handle pulls, $5 for fifty-five handle pulls, or $10 for one hundred twenty handle pulls. The player indicates that he would like to purchase fifty-five Jackpot Only handle pulls for $5, and $5 is automatically withdrawn from the player's stored credits. At that point, the gaming device 104 switches from using a first pay table to using a second payout table. Next, the player spins the reels fifty-five times. Upon the completion of the fifty-five jackpot only spins, the gaming device automatically returns to using the first payout table.

G. Additional Embodiments of the Invention

The methods of the present invention have been discussed at length with respect to embodiments primarily involving only a gaming device 104. However, the present invention may involve casino servers 102 as well as gaming devices 104. As previously indicated, the casino server 102 may store any of the databases 208, 308, 310 described above. Thus, the casino server may execute each of the control functions of the methods of the invention while the gaming device 104 merely generates outcomes as directed by the casino server 102.

In some embodiments, other options and/or offers may be presented to a player along with the jackpot only spin packages. For example, a casino, via a gaming device, may offer one hundred jackpot only spins for free if the player commits to eat dinner at the casino's restaurant. In another example, a gaming device may offer a player five additional ten jackpot only spin sessions if the player agrees to switch his long distance telephone service from to AT&T.

In some embodiments, a player may be presented with an opportunity to customize a jackpot only spin package. In such embodiments, a player may select a dollar amount that he would like to spend to purchase his jackpot only spin package as well as the number of jackpot only spins that he would like to get. For example, a player may decide he wants to spend $20 for ten thousand jackpot only spins. The gaming device may then calculate a jackpot only pay table that includes jackpot amounts and outcome probabilities to maintain the gaming device's hold percentage constant and/or within a range acceptable to the player, the casino, and any gaming authority. In some embodiments, a casino server 102 may compute a number of jackpot only spins a gaming device will generate for a player specified price. In such embodiments, the casino server 102 may determine the number of spins based upon factors related to stored gambling data about the player or any number of various other factors described above.

In some embodiments, a player device, such as a wireless PDA, may be used to invite a player to play a gaming device 104 with a jackpot only pay table and it may alert the gaming device 104 to the player's proximity using, for example, a wireless protocol (such as Bluetooth as described at http://www.bluetooth.com/dev/specifications.asp). Once identified, a users' information may be automatically transferred to the gaming device and log him into the casino's network 100. By merely approaching an enabled gaming device 104, the player's device could trigger the gaming device 104 to configure itself to support the player's preferred pay table and automatic spin package preferences. In some embodiments, a cell phone/PDA may be used to track and record the player's identity and preferences.

H. Conclusion

It is clear from the foregoing discussion that the disclosed systems and methods to facilitate rate of play optimization represents an improvement in the art of gaming. While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof. All such modifications are intended to be encompassed within the following claims.

What is claimed is:

1. A method comprising:

determining whether to offer a player of a gaming device a choice to switch the gaming device from using a first payout table to using a second payout table, wherein the second payout table consists exclusively of winning outcomes that pay only jackpots and losing outcomes that pay nothing;

presenting the offer to the player based on the determining; and receiving an election from the player to switch the gaming device from using the first payout table to using the second payout table.

2. The method of claim 1 wherein the winning outcomes correspond to a plurality of different outcome indicia combinations.

3. The method of claim 1 wherein the jackpots include a plurality of jackpot amounts.

4. The method of claim 1 wherein the jackpots include a plurality of jackpot amounts and wherein a jackpot amount is greater than a predefined multiple of a number of standard deviations of an average payout amount of the first payout table.

5. The method of claim 4 wherein the average payout amount of the first payout table is computed based upon at least one of an average of all possible payout amounts specified in the first payout table, and a weighted average of all possible payout amounts specified in the first payout table wherein the weighting is based upon a probability associated with each payout amount in the first payout table.

6. The method of claim 1 wherein the jackpots include a plurality of jackpot amounts and wherein a jackpot amount for each jackpot is greater than a predefined amount.

7. The method of claim 6 wherein the predefined amount is based upon an amount determined based upon the first payout table.

8. The method of claim 1 wherein the jackpots consist of a single jackpot amount.

9. The method of claim 8 wherein the single jackpot amount is determined based upon the highest payout amount in the first payout table.

10. The method of claim 1, wherein determining to offer includes monitoring play at the gaming device.

11. The method of claim 1, wherein determining to offer includes determining if the player perceives that the gaming device is in a cold period.

12. The method of claim 11 wherein determining if the player perceives that the gaming device is in a cold period includes determining if a number of non-winning outcomes generated by the gaming device exceeds a predefined threshold number of non-winning outcomes.

13. The method of claim 1, wherein determining to offer includes determining if the player is feeling frustrated.

14. The method of claim 1, wherein determining if the player is feeling frustrated includes determining if the player is pressing a play activator with an amount of force that exceeds a predefined threshold amount of force.

15. The method of claim 1, wherein determining to offer includes determining a wager amount associated with the second payout table.

16. The method of claim 1 wherein determining to offer includes determining a number of outcomes the gaming device will generate using the second payout table, to offer the player.

17. The method of claim 1 further including asking the player to indicate a number of outcomes the gaming device will generate using the second payout table that the player wants to purchase.

18. The method of claim 1 further including asking if the player wants the gaming device to switch back to using the first payout table.

19. The method of claim 1 further including switching the gaming device back to using the first payout table.

20. A method comprising:

monitoring play at a gaming device to determine if a player at the gaming device perceives that the gaming device is in a cold period;

offering, based on the monitoring, the player of the gaming device an opportunity to switch the gaming device from using a first payout table to using a second payout table, wherein the second payout table consists exclusively of winning outcomes that pay only jackpots and losing outcomes that pay nothing; and receiving an acceptance of the offer from the player to switch the gaming device from using the first payout table to using the second payout table, wherein the winning outcomes correspond to a plurality of different outcome indicia combinations, wherein the jackpots include a plurality of jackpot amounts, wherein each jackpot amount is greater than a predefined multiple of a number of standard deviations of an average payout amount of the first payout table, wherein the average payout amount of the first payout table is computed based upon at least one of:

an average of all possible payout amounts specified in the first payout table, and a weighted average of all possible payout amounts specified in the first payout table wherein the weighting is based upon a number of outcomes associated with each payout amount in the first payout table.

21. A gaming device comprising:

a processor; and a memory coupled to the processor, wherein the memory stores a program and a database, wherein the database includes a first payout table and a second payout table, and wherein the program includes instructions executable on the processor that are operable to:

determine whether to offer a player of a gaming device a choice to switch the gaming device from using the first payout table to using the second payout table, wherein the second payout table consists exclusively of winning outcomes that pay only jackpots and losing outcomes that pay nothing;

present the offer to the player based on the determination of whether to offer the choice to switch; and receive an election from the player to switch the gaming device from using the first payout table to using the second payout table.

22. The gaming device of claim 21, wherein the winning outcomes correspond to a plurality of different outcome indicia combinations.

23. The gaming device of claim 21, wherein the jackpots include a plurality of jackpot amounts.

24. The gaming device of claim 21, wherein the jackpots include a plurality of jackpot amounts and wherein a jackpot amount is greater than a predefined multiple of a number of standard deviations of an average payout amount of the first payout table.

25. The gaming device of claim 24, wherein the processor is operative to compute the average payout amount of the first payout table based upon at least one of:

an average of all possible payout amounts specified in the first payout table, and a weighted average of all possible payout amounts specified in the first payout table wherein the weighting is based upon a number of outcomes associated with each payout amount in the first payout table.

26. The gaming device of claim 21, wherein the jackpots include a plurality of jackpot amounts and wherein a jackpot amount for each jackpot is greater than a predefined amount.

27. The gaming device of claim 26, wherein the predefined amount is based upon an amount determined based upon the first payout table.

28. The gaming device of claim 21, wherein the jackpots consist of a single jackpot amount.

29. The gaming device of claim 28, wherein the single jackpot amount is determined based upon a highest payout amount in the first payout table.

30. The gaming device of claim 21, further including means for monitoring play at the gaming device coupled to the processor to provide input for the determination of whether to offer the choice to switch payout tables.

31. The gaming device of claim 21, further including means for determining if the player perceives that the gaming device is in a cold period coupled to the processor to provide input for the determination of whether to offer the choice to switch payout tables.

32. The gaming device of claim 31 wherein the means for determining if the player perceives that the gaming device is in a cold period includes means for determining if a number of non-winning outcomes generated by the gaming device exceeds a predefined threshold number of non-winning outcomes.

33. The gaming device of claim 21, further including means for determining if the player is feeling frustrated, coupled to the processor.

34. The gaming device of claim 33, wherein the means for determining if the player is feeling frustrated includes:

a play activator coupled to the processor; and a sensor coupled to the play activator and the processor, wherein the sensor is operable to generate a signal indicative of an amount of force that the player exerts on the play activator, and wherein the processor is operable to receive the signal and determine if the amount of force exceeds a predefined threshold amount of force.

35. The gaming device of claim 21, wherein the program further includes instructions operable to determine a wager amount associated with the second payout table.

36. The gaming device of claim 21, wherein the program further includes instructions operable to determine a number of outcomes the gaming device will generate using the second payout table, to offer the player.

37. The gaming device of claim 21 further including an input/output device coupled to the processor and operable to ask the player to indicate a number of outcomes the gaming device will generate using the second payout table that the player wants to purchase.

38. The gaming device of claim 21 further including an input/output device coupled to the processor and operable to ask if the player wants the gaming device to switch back to using the first payout table.

39. The gaming device of claim 21 further including means for switching the gaming device back to using the first payout table, coupled to the processor.

40. A gaming device comprising:

a processor;

an input/output device coupled to the processor; and a memory coupled to the processor, wherein the memory stores a program and a database, wherein the database includes a first payout table and a second payout table, and wherein the program includes instructions executable on the processor that are operable to:

monitor play at a gaming device to determine if a player at the gaming device is frustrated or perceives that the gaming device is in a cold period;

determine whether to offer, based on the determination of the player's mood or perception, the player of the gaming device an opportunity to switch the gaming device from using a first payout table to using a second payout table, wherein the second payout table consists exclusively of winning outcomes that pay only jackpots and losing outcomes that pay nothing; and receive, via the input/output device, an acceptance of the offer from the player to switch the gaming device from using the first payout table to using the second payout table, wherein the winning outcomes correspond to a plurality of different outcome indicia combinations, wherein the jackpots include a plurality of jackpot amounts, wherein each jackpot amount is greater than a predefined multiple of a number of standard deviations of an average payout amount of the first payout table, wherein the average payout amount of the first payout table is computed based upon at least one of:

an average of all possible payout amounts specified in the first payout table, and a weighted average of all possible payout amounts specified in the first payout table wherein the weighting is based upon a number of outcomes associated with each payout amount in the first payout table.

* * * * *